Patented Mar. 26, 1935

1,995,709

UNITED STATES PATENT OFFICE 1,995,709

HYDROXYPHENYLPROPANOLAMINE HYDROCHLORIDE

Walter H. Hartung, Baltimore, Md., assignor to Sharp & Dohme, Incorporated, Philadelphia, Pa., a corporation of Maryland No Drawing. Application September 22, 1931, Serial No. 564,473

14 Claims. (Cl. 260—128.5)

This invention relates to certain novel and valuable chemical products, namely the monohydroxyphenylpropanolamines which are prepared in the form of their salts.

In my co-pending application Serial No. 360,005, filed May 2, 1929, of which this is in part a continuation, I have described the new parahydroxyphenylpropanolamine hydrochloride and the method of preparing it by reacting parahydroxyphenylethyl ketone with butyl nitrite and then reducing the parahydroxyphenyloximinoethyl ketone thus formed. I have now found that the metahydroxyphenylpropanolamine hydrochloride can be prepared by a similar process, although with somewhat more difficulty.

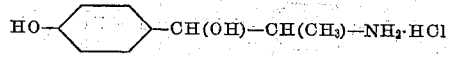

Parahydroxyphenylpropanolamine hydrochloride

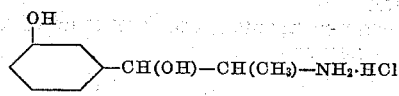

Metahydroxyphenylpropanolamine hydrochloride

These new compounds are valuable therapeutic agents. They are useful in increasing the blood pressure and in reducing the congestion in such tissues as the nasal mucosa appearing in such conditions as common colds and hay fever.

The para compound may be prepared in the following manner: 90 parts of parahydroxyphenylethyl ketone, $O=C(C_6H_4—OH)—C_2H_5$, are dissolved or suspended in about 400 parts of ether. Hydrogen chloride is slowly bubbled thru the solution or suspension while agitating it, and 61.8 grams of butyl nitrite is added during the course of sixty to ninety minutes. During the addition of the butyl nitrite the suspended ketone gradually dissolves. The solution is allowed to stand for at least an hour, but preferably over night, when it is repeatedly extracted with dilute alkali until all alkali-soluble material is removed. The alkaline extract is slowly acidified and the precipitate which forms is crude parahydroxyphenylalphaoximinoethyl ketone, $O=C(C_6H_4—OH)—CH(NOH)—CH_3$. This after recrystallization from water melts at 185° C.

10.8 parts of the oximinoethylketone thus prepared is dissolved in about 125 parts of absolute alcohol containing 5.6 parts of hydrogen chloride. The solution in an atmosphere of hydrogen is agitated with a catalyst composed of palladium supported on charcoal prepared by agitating a pure animal charcoal in an aqueous solution of palladium chloride in an atmosphere of hydrogen in the proportions of about one part of palladium chloride to six parts of charcoal. The agitation of the alcohol solution with the catalyst is continued until no more hydrogen is absorbed. This requires from 60 to 90 minutes. When reduction is complete the catalyst is filtered off and the filtrate evaporated to dryness at ordinary temperature in a desiccator. The residue is the hydrochloride of parahydroxyphenylalphaaminoethyl ketone, $O=C(C_6H_4—OH)—CH(NH_2.HCl)—CH_3$. This is dissolved in 200 parts of water and agitated with the palladium catalyst in an atmosphere of hydrogen until saturated. The product which is recovered from the solution is the hydrochloride of parahydroxyphenylpropanolamine, which, after recrystallization from absolute alcohol, melts at 206.5° C.

The corresponding free base has the following formula:

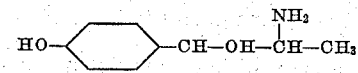

It can be prepared by treating the hydrochloride with ammonia.

Instead of preparing the aminoethylketone and then reducing it, as described above and in my co-pending application, the oximinoethylketone may be reduced directly to the alcohol in a single operation.

The hydrochloride of the metahydroxyphenylpropanolamine may be prepared by dissolving or suspending 90 parts of metahydroxyphenylethyl ketone, $O=C(C_6H_4—OH)—C_2H_5$, in about 400 parts of ether. Hydrogen chloride is slowly bubbled thru the solution or suspension while agitating it and 61.8 grams of butyl nitrite is added during the course of sixty to ninety minutes. During the addition of the butyl nitrite the suspended metahydroxyphenylethyl ketone gradually dissolves. The mixture or solution is allowed to stand for at least an hour, but preferably over night. It is then repeatedly extracted with dilute alkali until all alkali-soluble material is removed. The alkaline extract is slowly acidified and the precipitate which forms is crude metahydroxyphenylalphaoximinoethyl ketone. After recrystallization from water this melts at 138° C.

10.8 parts of this meta ketone is dissolved in about 125 parts of absolute alcohol containing 5.6 parts of hydrogen chloride. The solution is agitated with a catalyst such as the palladium catalyst above described in an atmosphere of hydrogen until no more hydrogen is absorbed. This requires from 60 to 90 minutes or more. When reduction is complete the catalyst is filtered off and the filtrate evaporated to dryness by being placed in a desiccator at ordinary temperature. The residue is the hydrochloride of metahydroxyphenylalphaaminoethyl ketone. This is purified by recrystallization from absolute alcohol. It is then dissolved in 200 parts of water and agitated with a further quantity of the palladium catalyst in an atmosphere of hydrogen until saturated. The product thus recovered from the solution is the hydrochloride of metahydroxyphenylpropanol amine. After recrystallization from absolute alcohol this melts at 177° C.

The corresponding free base has the following formula:

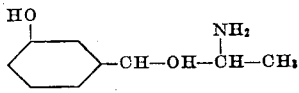

It can be prepared from the hydrochloride by treatment with ammonia.

The invention is not limited to the production of the new compounds by the methods disclosed.

I claim:

1. As new products monohydroxyphenylpropanolamine hydrochlorides.

2. As a new product parahydroxyphenylpropanolamine hydrochloride.

3. As a new product metahydroxyphenylpropanolamine hydrochloride.

4. A monohydroxyphenylpropanolamine hydrochloride of sufficient purity to be used therapeutically.

5. Parahydroxyphenylpropanolamine hydrochloride of sufficient purity to be used therapeutically.

6. Metahydroxyphenylpropanolamine hydrochloride of sufficient purity to be used therapeutically.

7. The process which consists in causing nitrous acid to act upon a compound of the following formula

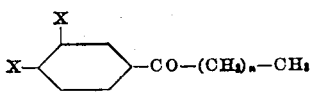

wherein at least one X stands for hydroxy, the other for hydrogen, $n$ being 1 or a multiple thereof, and reducing the isonitroso compound thus obtained.

8. The process which consists in causing nitrous acid to act upon a compound of the following formula

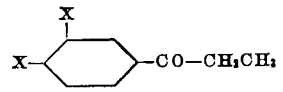

wherein at least one X stands for hydroxy, the other for hydrogen and reducing the isonitroso compound thus obtained.

9. The process which consists in causing nitrous acid to act upon a compound of the following formula

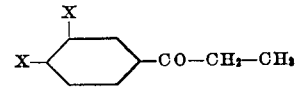

wherein at least one X stands for hydroxy, the other for hydrogen and reducing the isonitroso compound thus obtained, by means of hydrogen in presence of a hydrogenation catalyst.

10. The process which consists in causing butyl nitrite and a strong mineral acid to act upon para-hydroxy-propiophenone and reducing the para-hydroxy-isonitrosopropiophenone thus obtained by means of hydrogen in presence of a hydrogenation catalyst.

11. The process which consists in causing butyl nitrite and a strong mineral acid to act upon meta-hydroxy-propiophenone and reducing the meta-hydroxy-isonitroso-propiophenone thus obtained by means of hydrogen in presence of a hydrogenation catalyst.

12. As new products, the compounds of the following formula

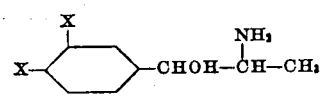

wherein one X stands for hydroxy, the other for hydrogen.

13. As a new product, the compound of the following formula

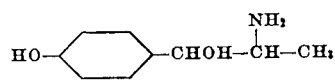

the hydrochloride of which melts at 207° C.

14. As a new product, the compound of the following formula

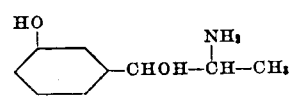

the hydrochloride of which melts at 180° C.

WALTER H. HARTUNG.